(12) United States Patent
Kitazawa

(10) Patent No.: US 7,466,327 B2
(45) Date of Patent: Dec. 16, 2008

(54) LINE HEAD AND IMAGE FORMING APPARATUS

(75) Inventor: Takayuki Kitazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 391 days.

(21) Appl. No.: 11/186,985

(22) Filed: Jul. 22, 2005

(65) Prior Publication Data

US 2006/0066709 A1 Mar. 30, 2006

(30) Foreign Application Priority Data

Sep. 30, 2004 (JP) ............................. 2004-288495
Jan. 4, 2005 (JP) ............................. 2005-000080

(51) Int. Cl.
G03G 15/043 (2006.01)
B41J 2/45 (2006.01)

(52) U.S. Cl. ...................................... 347/130; 347/238
(58) Field of Classification Search ................. 347/130, 347/238
See application file for complete search history.

(56) References Cited

U.S. PATENT DOCUMENTS

| | | | | |
|---|---|---|---|---|
| 4,796,224 A | * | 1/1989 | Kawai et al. ................... 365/51 |
| 5,818,488 A | * | 10/1998 | Tanuma et al. .............. 347/130 |
| 6,573,920 B2 | * | 6/2003 | Shimoda et al. ............ 347/129 |
| 7,126,268 B2 | * | 10/2006 | Kitazawa ..................... 313/500 |
| 7,193,591 B2 | * | 3/2007 | Yumoto ......................... 345/82 |
| 2002/0024510 A1 | * | 2/2002 | Ozawa ......................... 345/204 |
| 2003/0179164 A1 | * | 9/2003 | Shin et al. ..................... 345/76 |
| 2004/0114026 A1 | * | 6/2004 | Kondo et al. ................ 347/238 |
| 2005/0083768 A1 | * | 4/2005 | Hara ........................... 365/232 |
| 2006/0022601 A1 | * | 2/2006 | Kitazawa ................. 315/169.1 |
| 2006/0065812 A1 | * | 3/2006 | Kitazawa ................. 250/208.1 |
| 2006/0066708 A1 | * | 3/2006 | Kitazawa .................... 347/128 |
| 2006/0076898 A1 | * | 4/2006 | Kitazawa ................. 315/169.3 |

FOREIGN PATENT DOCUMENTS

| | | |
|---|---|---|
| JP | A-06-234238 | 8/1994 |
| JP | A 11-274569 | 10/1999 |
| JP | A-2002-023593 | 1/2002 |
| JP | A-2003-177680 | 6/2003 |

OTHER PUBLICATIONS

Computer-generated translation of JP-06234238 cited in the IDS filed on Mar. 4, 2008.*

* cited by examiner

Primary Examiner—Huan H Tran
(74) Attorney, Agent, or Firm—Oliff & Berridge, PLC

(57) ABSTRACT

A line head includes pixel circuits each of which has a plurality of light-emitting elements and circuit elements arranged in a line, and which allow the light-emitting elements to selectively emit light, based on selection signals and data signals; data lines that are arranged adjacent to the pixel circuits along one side of the pixel circuits and to which the data signals are supplied to the pixel circuits; and a selection circuit that generates the selection signals.

5 Claims, 5 Drawing Sheets

LINE HEAD AND IMAGE FORMING APPARATUS

BACKGROUND

The present invention relates to a line head and an image forming apparatus.

A line head has been used as a device that is incorporated into an electrophotographic image forming apparatus, such as a copy machine or a printer, to form (expose) an electrostatic latent image on a surface of a photoconductor. The line head includes a plurality of light-emitting elements one-dimensionally arrayed on a substrate, and the respective light-emitting elements are driven through wiring lines patterned on the substrate. Light emitting diodes (LEDs) or organic EL elements have been employed as the light-emitting elements of the line head. For example, Japanese Unexamined Patent Application Publication No. 11-274569 discloses a light-emitting element array corresponding to the line head and an image forming apparatus.

However, since the data line of the line head has a length of several tens of centimeters in the related art, parasitic capacitance thereof becomes several tens of farads. In addition, the line head has a problem in that the parasitic capacitance of the data line is increased since a power supply wiring line or a ground wiring line intersects the data line, which makes it difficult to perform a high-speed operation.

SUMMARY

An advantage of the invention is that it provides a line head and an image forming apparatus capable of reducing the parasitic capacitance of data lines.

According to an aspect of the invention, a line head includes pixel circuits each of which has a plurality of light-emitting elements and circuit elements arranged in a line, ant which allow the light-emitting elements to selectively emit light, based on selection signals and data signals; data lines that are arranged adjacent to the pixel circuit along one side of the pixel circuit and through which the data signals are supplied to the pixel circuit; and a selection circuit that generates the selection signals. According to this structure, since the data lines are arranged adjacent to the pixel circuit, it is possible to connect the data lines with the pixel circuit without crossing other wiring lines, such as the power supply wiring lines or the ground wiring lines. Accordingly, electrostatic capacitance (parasitic capacitance) parasitic on the data line can be reduced, and waveform distortion of the data signals can be reduced. Thus, it is possible to achieve a high-speed operation of the line head.

Further, in the above-mentioned structure, it is preferable that the selection circuit be arranged to be opposite to the pixel circuit with the data lines interposed therebetween. According to this structure, since the selection circuit and the data lines are arranged on the same side with respect to the pixel circuit, it is possible to supply the data signals and the selection signals to the pixel circuit with high efficiency.

Furthermore, in the above-mentioned structure, it is preferable that the light-emitting elements be organic EL elements. According to this structure, it is possible to achieve the above-mentioned various operations and effects by a line head using the organic EL elements as light-emitting elements.

Moreover, according to another aspect of the invention, an image forming apparatus includes photoconductors, charging units that uniformly charge the photoconductors; exposing units that have the above-mentioned line heads, respectively, to form electrostatic latent images of images to be formed on the photoconductors by exposing the photoconductors; developing units that develop the electrostatic latent images formed on the photoconductors into toner images; transferring units that transfer the toner images formed on the photoconductors onto a transferring member; and photographic fixing units that fix the toner images formed on the transferring member. According to this structure, since the data lines of the line head can be directly connected to the light-emitting elements without crossing the power supply wiring lines, it is possible to reduce the parasitic capacitance of the data lines, and thus to achieve a high-speed operation of the line head.

Further, in the above-mentioned structure, it is preferable that the above-mentioned image forming apparatus form color images. According to this structure, since the data lines of the line head are directly connected to the light-emitting elements without crossing the power supply wiring lines, it is possible to reduce the parasitic capacitance of the data lines, and thus to achieve a high-speed operation of the line head.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Hereinafter, a line head and an image forming apparatus according to an embodiment of the invention will be described with reference to the drawings.

Figure 1:
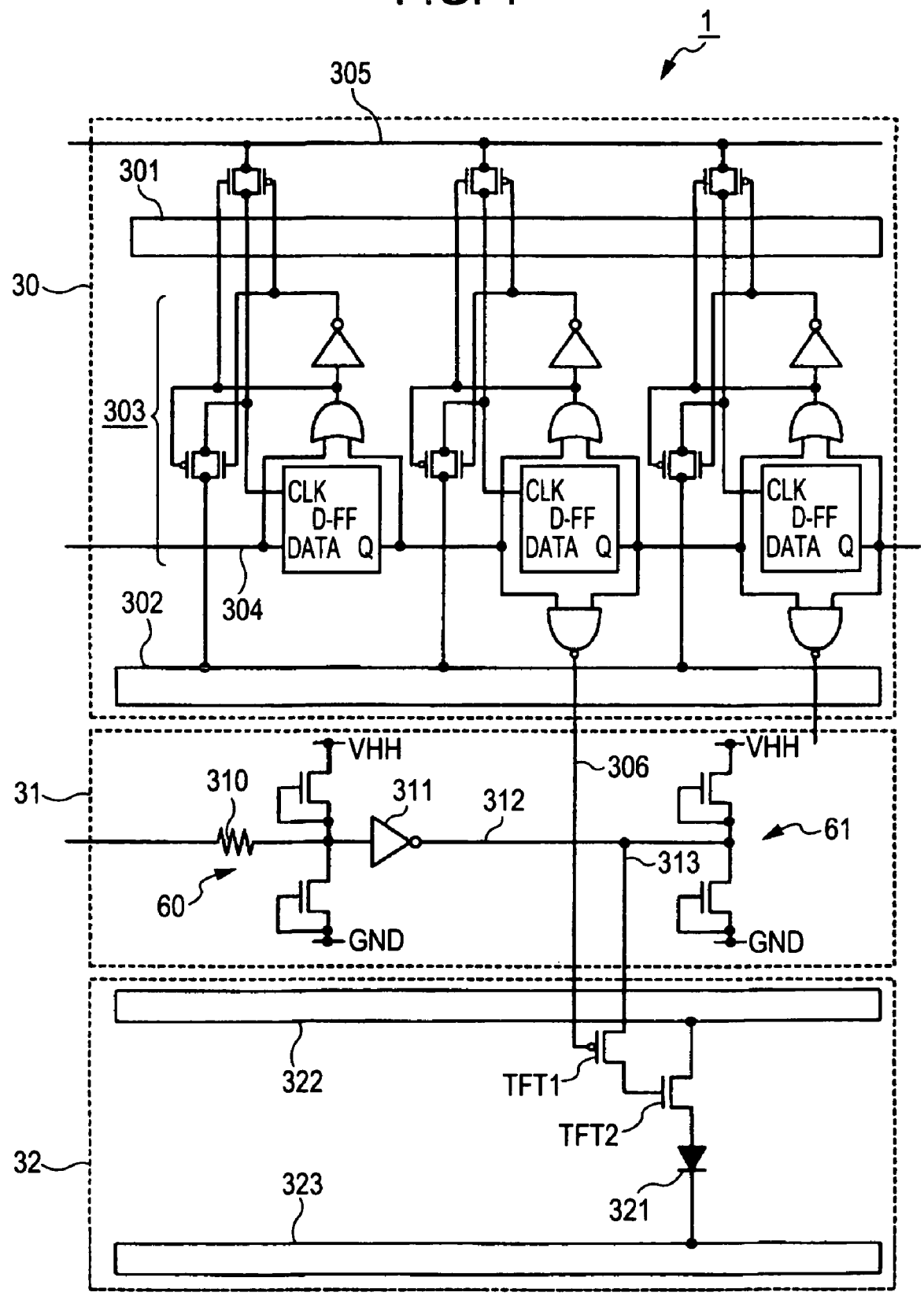
FIG. 1 is a circuit diagram schematically showing a circuit configuration of a line head according to an embodiment of the invention.

FIG. 1 is a circuit diagram schematically showing a circuit configuration of a line head according to an embodiment. A line head 1 includes a selection circuit 30, a data line unit 31, and a pixel circuit 32 as main components. The selection circuit 30 includes a shift register 303 for sequentially driving the pixel circuit 32, a power supply wiring line 301 for the selection circuit, and a ground wiring line 302 for the selection circuit. The shift register 303 sequentially transmits start pulse signals supplied to a front stage thereof via a start pulse signal line 304 to a rear stage thereof in synchronization with a clock signal supplied from a clock signal line 305. Further, the shift register 303 supplies signals output from each stage to the pixel circuit 32 via gate lines 306 as selection signals for sequentially selecting light-emitting elements 321.

The data line unit 31 is a wiring line unit which transmits a data signal for making the light-emitting element 321 emit light/not emit light through a protective resistor 310 and an input buffer 311 provided on a data line 312. The data signal is supplied to the data line 312 from the outside in synchronization with the clock signal, and is supplied to the pixel circuit 32 via a lead line 313. In addition, the data line 312 is additionally provided with an ESD protective element 60 between the protective resistor 310 and the input buffer 311, and is additionally provided with an ESD protective element 61 at the leading end thereof.

The pixel circuit 32 includes a holding transistor TFT1, a driving transistor TFT2, a light-emitting element 321, an anode wiring line 322 for the pixel circuit, and a cathode wiring line 323 for the pixel circuit. In the holding transistor TFT1, a gate terminal, a source terminal, and a drain terminal are connected to the gate line 306, the lead line 313, and a gate terminal of the driving transistor TFT2, respectively. Meanwhile, in the driving transistor TFT2, a source terminal is connected to a power source, that is, the anode wiring line 322 for the pixel circuit, and a drain terminal is connected to an anode terminal of the light-emitting element 321. The light-emitting element 321 is, for example, an organic EL light-emitting element in which a light emitter is made of an organic material, or it may be an LED. A cathode terminal of the light-emitting element 321 is connected to a GND, that is, the cathode wiring line 323 for the pixel circuit.

The light-emitting element 321 of the pixel circuit 32 is selected by the selection signal which is input from the shift register 303 via the gate line 306, and is controlled so as to emit light or so as not to emit light in response to the data signal which is input via the data line 312 and the lead line 313. In other words, the shift register 303 selects the light-emitting element 321 by sequentially transmitting the start pulse signal to the rear stage thereof in synchronization with the clock signal. The light-emitting element 321 selected by the shift register 303 in this way is controlled so as to emit light or so as not to emit light according to a voltage level of the data signal, that is, an L (low) level or H (high) level.

Although only one light-emitting element 321 is shown in FIG. 1, in practice, n (for example, 5120) light-emitting elements 321 are arranged on a substrate in one line. The n light-emitting elements 321 are composed of blocks each having m (for example, 128) light-emitting elements, and the blocks are selected by the selection signals output from the respective stages of the shift register 303.

Figure 2:
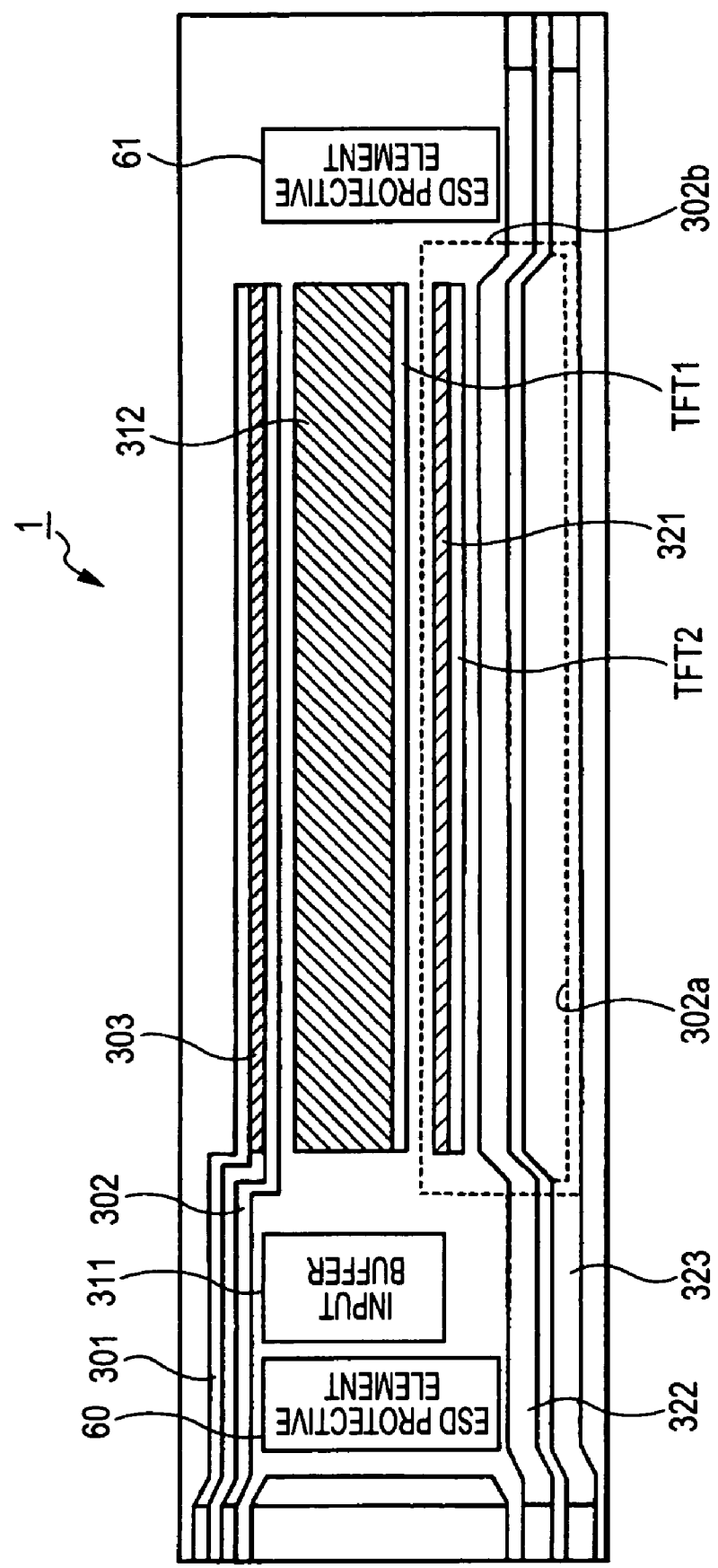
FIG. 2 is a view showing a circuit layout of the line head according to the embodiment.

Next, FIG. 2 is a view schematically illustrating a circuit layout of the line head 1, and clearly shows the characteristics of the embodiment. In FIG. 2, the same components as those in FIG. 1 have the same reference numerals.

The light-emitting elements 321 are arranged in one line on a rectangular substrate so as to form a light-emitting-element line parallel to longer sides of the substrate. The driving transistors TFT2 are arranged in a line below the light-emitting elements 321 so as to form a driving-circuit line. The anode wiring line 322 for the pixel circuit is disposed on a lower side of the driving transistors TFT2 along the light-emitting elements 321, that is, along the driving transistors TFT2. In addition, the cathode wiring line 323 for the pixel circuit is disposed on a lower side of the anode wiring line 322 for the pixel circuit along the light-emitting elements 321.

In addition, a ground contact part 302a and a rear electrode 302b are provided on the substrate. The rear electrode 302b is disposed on the top of the substrate, and is connected to a cathode electrode of each light-emitting element 321. The ground contact part 302a connects the rear electrode 302b to the cathode wiring line 323 for the pixel circuit.

Meanwhile, a holding-circuit line composed of a row of holding transistors TFT1 is arranged on the upper side of the light-emitting elements 321. The data lines 312 are disposed on the upper side of the holding transistors TFT1 along the light-emitting elements 321, that is, along the holding transistors TFT1, and the start pulse signal line 304 and the clock signal line 305 are provided on the data line 312 along the light-emitting elements 321, similar to the data line 312.

Further, the number of data lines 312, that is, 128, is equal to the number of light-emitting elements 321 constituting one block.

Further, the shift register 303 (the selection circuit 30) is provided between the power supply wiring line 301 for the selection circuit and the ground wiring line 302 for the selection circuit along the direction in which the light-emitting elements 321 are arrayed. Moreover, the gate line 306 (not shown) is provided on a layer different from the layer having the data line 312 between the output terminal of each stage of the shift register 303 and the gate terminal of the holding transistor TFT1 so as to be laid across the data line 312.

In addition, as described above, the ESD protective element 60 is provided between the protective resistor 310 and the input buffer 311 provided on the data line 312, and the ESD protective element 61 is provided at the leading end of the data line 312. Therefore, the ESD protective element 60 is arranged in the middle portion of the data line 312 provided in the crosswise direction, that is, in a position from the left side of the substrate to the light-emitting elements 321, as shown. On the other hand, since the ESD protective element 61 is provided at the leading end of the data line 312, it is arranged on the right side of the substrate.

Further, although not shown, the above-mentioned lead line 313 is provided between the data line 312 and the holding transistor TFT1. The lead line 313 is provided on a layer different from the layer having the data lines 312 thereon so as to connect the data line 312 with the holding transistor TFT1 at the shortest distance, that is, in the vertical direction. Furthermore, the holding transistor TFT1 and the driving transistor TFT2 are arranged above and below the light-emitting elements 321 so as to interpose the light-emitting elements 321 therebetween. Consequently, the drain terminal of the holding transistor TFT1 and the gate terminal of the driving transistor TFT2 are connected to each other by a connection wiring line (not shown) arranged so as to be laid across the light-emitting element 321.

The line head 1 is characterized in that the selection circuit 30, the data line unit 31, and the pixel circuits 32 are arranged on the substrate in this order, that is, the data line unit 31 is arranged between the selection circuit 30 and the pixel circuits 32. When the above-mentioned structure is employed, the data line 312 intersects the gate line 306 leading from the selection circuit 30, but does not intersect the power supply wiring line 301 for the selection circuit and the ground wiring line 302 for the selection circuit. Therefore, the parasitic capacitance of the data line 312 can be reduced to a minimum. Since waveform distortion of the data signal can be prevented by reducing the parasitic capacitance of the data line 312 to the minimum, it is possible to operate the line head at high speed.

Furthermore, since the line head 1 includes the data line unit 31 and the selection circuit 30, which are disposed on one side of the pixel circuit 32, it is possible to supply the data signal and the selection signal to the pixel circuit with high efficiency. When the data line unit 31 is arranged to be opposite to the selection circuit 30 with the pixel circuit 32 interposed therebetween, the data signal and the selection signal are supplied to the pixel circuit 32 in different directions. Therefore, it is possible to arrange wiring lines with high efficiency.

Next, an image forming apparatus according to this embodiment, in which the above-mentioned line heads 1 are used as four line heads 11K, 11C, 11M, and 11Y, will be described.

First, image data processing by the image forming apparatus will be described with reference to the block diagram shown in FIG. 3. A whole control device which controls the overall operation of the image forming apparatus is provided with a data processing unit 9 including a CPU, an image processing circuit, etc., and a storage unit 10 storing original image data, etc. In addition, the image forming apparatus forms a color image as well as a black-and-white image, and includes four line heads 11K, 11C, 11M, and 11Y respectively corresponding to 'black', 'cyan', 'magenta', and 'yellow', which are the primary colors used for forming an image.

Here, letters K, C, M, and Y which are attached to the ends of the reference numerals of the line heads 11K, 11C, 11M and 11Y, means black, cyan, magenta, and yellow, which are the primary colors used for forming an image, respectively. The addition of the letters K, C, M, and Y is similarly applied to other members to be described below.

The data processing unit 9 reads the original image data (bitmap data) which is transmitted to the image forming apparatus from an external host computer and is stored in the storage unit 10, and then performs a screen process, a color conversion process, a data conversion process, and a data transmission process. The screen process is a process in which a line pattern, an error diffusion pattern, a dot pattern, etc., are combined to match the process condition of the image forming apparatus and to secure gray-scale reproducibility.

The color conversion process converts the screen-processed image data into data that is separated into colors corresponding to the respective line heads 11K, 11C, 11M, and 11Y. The data conversion process converts the color-conversion-processed image data into data signals to be transmitted to the respective line heads 11K, 11C, 11M, and 11Y. The data transmission process is a process that transmits the data signals for transmission to the respective line heads 11K, 11C, 11M, and 11Y.

Figure 4:
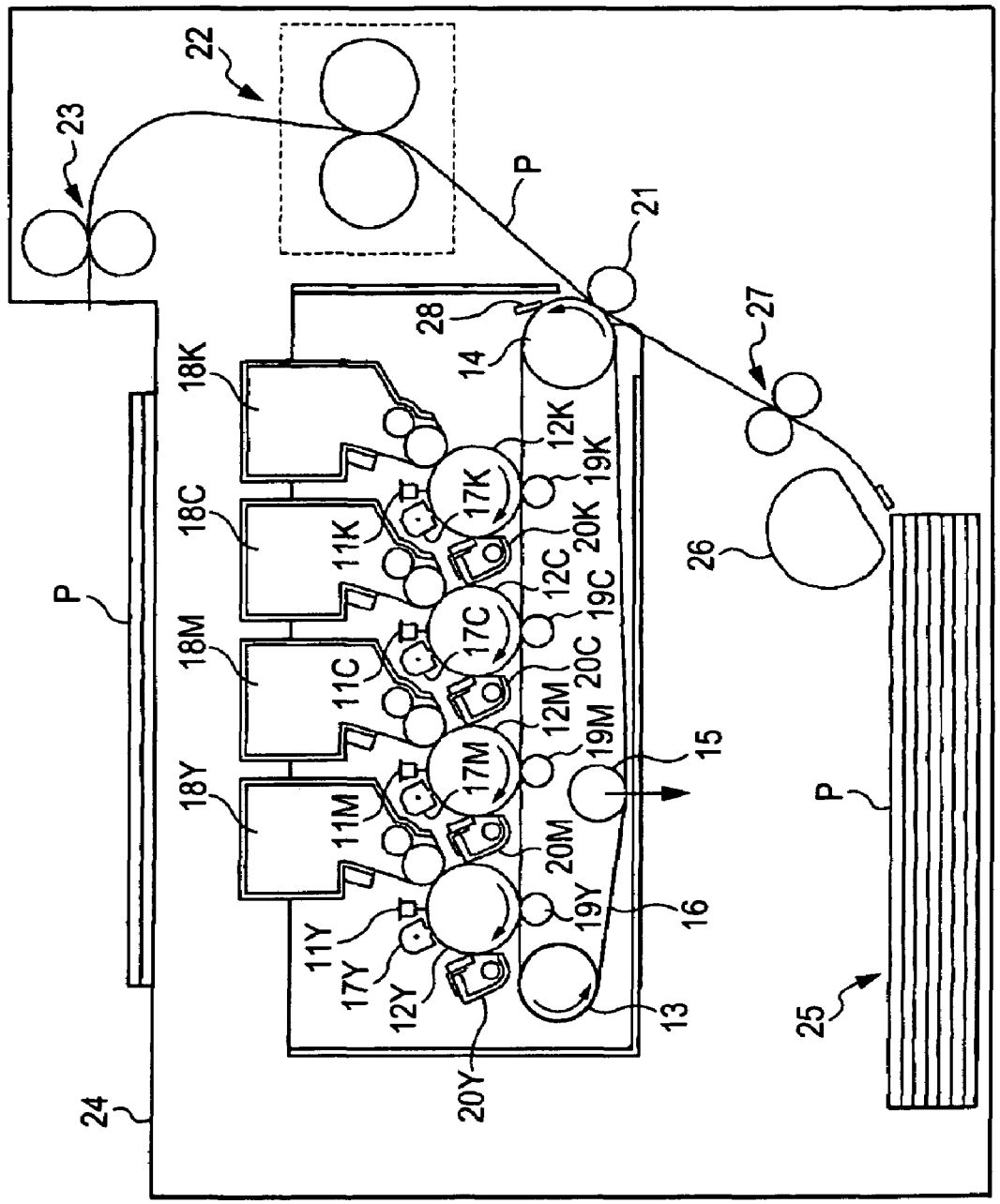
FIG. 4 is a cross-sectional view showing a mechanical configuration of the image forming apparatus according to the embodiment of the invention.

FIG. 4 is a cross-sectional view showing the mechanical structure of the image forming apparatus according to this embodiment. In the image forming apparatus, four line heads 11K, 11C, 11M, and 11Y having the same structure are arranged in exposure positions of the corresponding four photoconductor drums 12K, 12C, 12M, and 12Y having the same structure, respectively, and the image forming apparatus is of a tandem type.

The image forming apparatus includes a driving roller 13, a driven roller 14, a tension roller 15, and an intermediate transfer belt 16 which is suspended by tension applied by the tension roller 15 and is circularly driven in the direction of arrows shown in FIG. 4 (counterclockwise direction). The photoconductor drums 12K, 12C, 12M, and 12Y that have photosensitive layers on the outer circumferential surface thereof, respectively, are arranged at predetermined intervals from the intermediate transfer belt 16 as four image carriers.

The photoconductor drums 12K, 12C, 12M, and 12Y are driven to be rotated in the direction of arrows shown in FIG. 4 (clockwise direction) in synchronization with the driving of the intermediate transferring belt 16. Further, corona chargers 17K, 17C, 17M, and 17Y that uniformly charge the outer circumferential surfaces of the respective photoconductor drums 12K, 12C, 12M, and 12Y, and the line heads 11K, 11C, 11M, and 11Y that sequentially line-scan the uniformly charged circumferential surfaces of the respective photoconductor drums 12K, 12C, 12M, and 12Y in synchronization with the rotation of the photoconductor drums 12K, 12C, 12M, and 12Y are arranged around the respective photoconductor drums 12K, 12C, 12M, and 12Y.

Moreover, developing devices 18K, 18C, 18M, and 18Y that apply toners, as serving developers, on an electrostatic latent image formed by the line heads 11K, 11C, 11M, and 11Y in order to develop toner images, primary transfer rollers 19K, 19C, 19M, and 19Y, serving as transfer devices, that sequentially transfer the toner images developed by the developing devices 18K, 18C, 18M, and 18Y onto the intermediate transfer belt 16, which is a first transfer object, and cleaning devices 20K, 20C, 20M, and 20Y that remove the toner remaining on the surface of the photoconductor drums 12K, 12C, 12M, and 12Y after transferring are arranged around the photoconductor drums 12K, 12C, 12M, and 12Y, respectively.

In this case, each of the line heads 11K, 11C, 11M, and 11Y is fixed in the image forming apparatus so that the arranging direction of the organic EL light-emitting elements is parallel to buses of the respective photoconductor drums 12K, 12C, 12M, and 12Y. Furthermore, peak wavelengths of emission energy of the respective line heads 11K, 11C, 11M, and 11Y are set to be substantially equal to peak wavelengths of sensitivity of the respective photoconductor drums 12K, 12C, 12M, and 12Y.

Since the developing devices 18K, 18C, 18M, and 18Y use, for example, a single nonmagnetic component toner, as a developer, the electrostatic latent image is developed into a toner image by, for example, carrying a single-component developer to a developing roller using a feed roller, by regulating the thickness of the developer attached on the surface of the developing roller using a regulating blade, and by contacting or pressing the developing roller with or against the respective photoconductor drums 12K, 12C, 12M, and 12Y so as to attach the developer on the electrostatic latent image according to the electrical potential levels of the respective photoconductor drums 12K, 12C, 12M, and 12Y.

The black, cyan, magenta, and yellow toner images formed by four monochromatic toner image forming stations are sequentially primary-transferred onto the intermediate transfer belt 16 by a primary transferring bias applied to the primary transfer rollers 19K, 19C, 19M, and 19Y. Then, a full color toner image formed by sequentially superposing the toner images on the intermediate transfer belt 16 is secondary-transferred onto a recording medium P, such as paper, by a secondary transfer roller 21, and is fixed on the recording medium P through a pair of photographic fixing rollers 22, serving as a photographic fixing unit. The recording medium P is discharged by a pair of sheet-discharging rollers 23 to a sheet-discharging tray 24 provided on the upper side of the apparatus. In addition, a secondary transferring portion is formed between the secondary transfer roller 21 and the intermediate transfer belt 16.

Furthermore, in the above-mentioned mechanical structure, reference numeral 25 denotes a sheet-feeding cassette having a large number of recording media P therein, and reference numeral 26 denotes a pick-up roller that feeds the recording media P from the paper feeding cassette 25 one by one. Also, reference numeral 27 denotes a pair of gate rollers that regulate the feeding timing of the recording media P to the secondary transferring portion of the secondary transfer roller 21, and reference numeral 28 denotes a cleaning blade that removes the toner remaining on the surface of the intermediate transfer belt 16 after secondary transferring.

Figure 3:
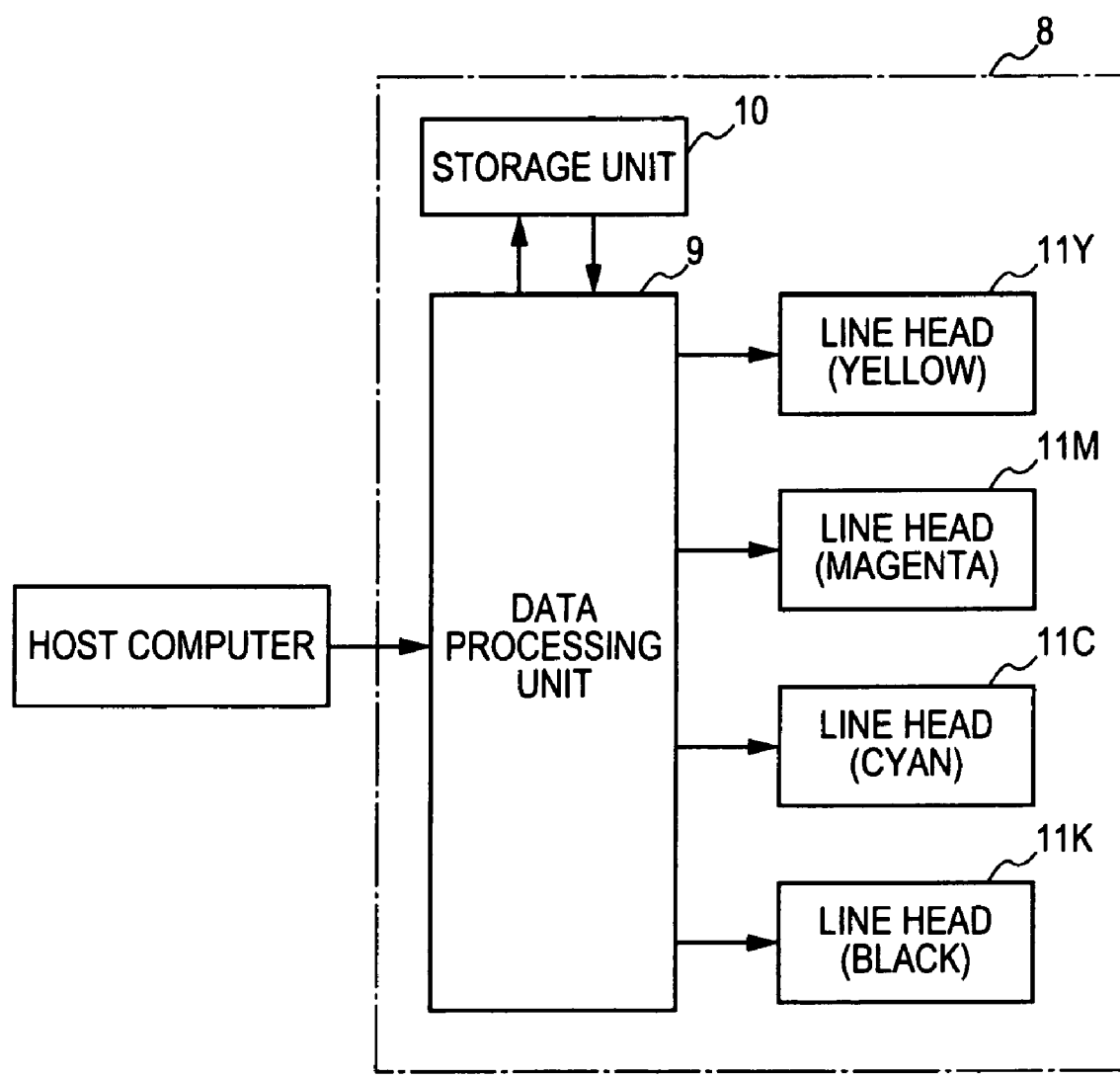
FIG. 3 is a block diagram showing image data processing by an image forming apparatus according to an embodiment of the invention.

An image forming apparatus 70 shown in FIG. 3, which employs the line head 1 according to the invention, can be applied to a tandem-type color printer or a four-cycle color printer. Since the parasitic capacitance of the data line can be limited to a minimum by employing the structure of the invention in these color printers, it is possible to operate the line head at high speed.

Figure 5:
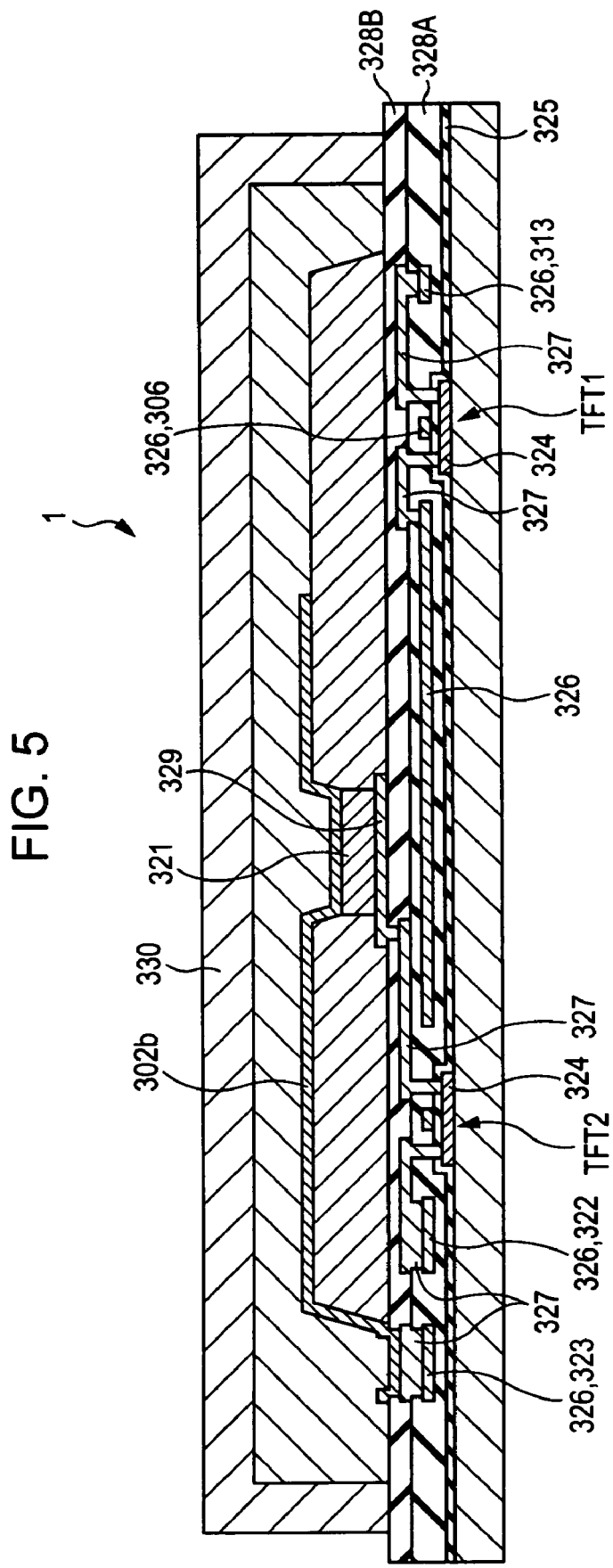
FIG. 5 is a cross-sectional view showing the vicinity of light-emitting elements in the line head according to the embodiment of the invention.

Next, the layout of the pixel circuit 32 in the above-mentioned line head 1 will be additionally described. FIG. 5 is a cross-sectional view showing the pixel circuit 32 of the line head 1. In FIG. 5, reference numeral 324 denotes a semiconductor layer, and reference numeral 325 denotes a gate insulating film. Reference numeral 326 denotes a gate metal wiring line, and reference numeral 327 denotes a source metal wiring line. In addition, reference numerals 328A and 328B denote interlayer insulating films, reference numeral 329 denotes a transparent electrode, and reference numeral 330 denotes a sealing substrate.

The holding transistor TFT1, the driving transistor TFT2, and a light-emitting element (organic EL light emitting layer) 321 are formed on a glass substrate by the semiconductor layer 324, the gate metal wiring line 326, and the source metal wiring line 327. The holding transistor TFT1 and the driving transistor TFT2 are composed of the semiconductor layer 324 and the gate insulating film 325, respectively, as shown in FIG. 5. The light-emitting element 321 is interposed between the rear electrode 302b the transparent electrode 329 in the vertical direction, and is arranged between the holding transistor TFT1 and the driving transistor TFT2 in the horizontal direction.

The transparent electrode 329 is connected to, for example, the drain terminal of the driving transistor TFT2 via the source metal wiring line 327, and the rear electrode 302b is connected to the cathode wiring line 323 for the pixel circuit composed of the gate metal wiring line 326 via the source metal wiring line 327. In addition, the source terminal of the driving transistor TFT2 is the anode wiring line 322 for the pixel circuit composed of the gate metal wiring line 326 via the source metal wiring line 327. The anode wiring line 322 for the pixel circuit and the cathode wiring line 323 for the pixel circuit are arranged on the opposite side of the light-emitting element 321 with respect to the driving transistor TFT2, as shown in FIG. 5.

Further, the gate metal wiring line 326 forming the gate terminal is provided on the gate insulating film 325 constituting the driving transistor TFT2, and the gate terminal of the driving transistor TFT2 is connected to, for example, the drain terminal of the holding transistor TFT1 via the gate metal wiring line 326. The source terminal of the holding transistor TFT1 is connected to the lead line 313 composed of the gate metal wiring line 326 via the source metal wiring line 327. Furthermore, the gate metal wiring line 326 constituting the gate terminal is provided on the gate insulating film 325 constituting the holding transistor TFT1, and the gate terminal of the holding transistor TFT1 is connected to the gate line 306 composed of the gate metal wiring line 326.

In the above-mentioned line head 1, although the light-emitting element 321 is arranged between the drain terminal of the driving transistor TFT2 and the cathode wiring line 323 for the pixel circuit, the arranging position of the light-emitting element 321 is not limited thereto. For example, the light-emitting element 321 may be arranged between the source terminal of the driving transistor TFT2 and the cathode wiring line 323 for the pixel circuit by connecting the anode terminal of the light-emitting element 321 to the source terminal of the driving transistor TFT2 and by connecting the cathode terminal of the light-emitting element 321 to the cathode wiring line 323 for the pixel circuit.

What is claimed is:

1. A line head comprising:
   a plurality of light-emitting elements arranged in a line, at least one of the plurality of light-emitting elements emitting light selectively based on a selecting signal and a data signal;
   a data line that is arranged adjacent to the light-emitting elements along one side of the light-emitting elements and supplies the data signal; and
   a plurality of shift registers, at least one of the shift registers generating the selecting signal,
   wherein the shift registers are arranged to be opposite to the light-emitting elements with the data line interposed therebetween.

2. The line head according to claim 1,
   wherein the light-emitting elements are organic EL elements.

3. An image forming apparatus comprising:
   photoconductors;
   charging units that uniformly charge the photoconductors;
   exposing units that have the line heads according to claim 1, respectively, to form electrostatic latent images of images to be formed on the photoconductors by exposing the photoconductors;
   developing units that develop the electrostatic latent images formed on the photoconductors into toner images;
   transferring units that transfer the toner images formed on the photoconductors onto a transferring member; and
   photographic fixing units that fix the toner images formed on the transferring member.

4. The image forming apparatus according to claim 3,
   wherein the image forming apparatus forms color images.

5. The line head according to claim 1, further comprising:
   a plurality of transistors arranged in a line along the plurality of light-emitting elements.

* * * * *